United States Patent
Pratt

(10) Patent No.: US 6,322,675 B1
(45) Date of Patent: Nov. 27, 2001

(54) COPPER REMOVAL SYSTEM FOR ABSORPTION COOLING UNIT

(75) Inventor: Alfred J. Pratt, Albuquerque, NM (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 09/503,648

(22) Filed: Feb. 14, 2000

(51) Int. Cl.[7] ................................ C25B 15/00; C25B 9/00
(52) U.S. Cl. ........................................ 204/239; 204/275.1
(58) Field of Search .................................. 204/237, 239, 204/275.1, 278.5; 205/772

(56) References Cited

U.S. PATENT DOCUMENTS

| | | | |
|---|---|---|---|
| 3,784,455 | * 1/1974 | Parikh et al. | ............ 205/772 X |
| 4,514,270 | * 4/1985 | Furutani et al. | ............ 204/237 X |
| 4,557,811 | * 12/1985 | Furst et al. | ............ 205/772 |
| 4,973,380 | * 11/1990 | Pryor et al. | ............ 204/262 X |
| 6,009,721 | * 1/2000 | Fukuda et al. | ............ 62/476 |

\* cited by examiner

*Primary Examiner*—Donald R. Valentine
(74) *Attorney, Agent, or Firm*—Wall Marjama & Bilinski

(57) ABSTRACT

An on line copper removal system for use in an absorption cooling unit which includes an evaporator, an absorber, a generator and a condenser which are interconnected to provide an absorption cycle in which a lithium bromide solution which contains a deleterious amount of copper is circulated through said unit through a series of interconnected flow lines and pumps. An electroplating cell is positioned in a bypass connection to a flow line to selectively plate copper out of said lithium bromide solution while said unit is in operation.

4 Claims, 4 Drawing Sheets

COPPER REMOVAL SYSTEM FOR ABSORPTION COOLING UNIT

FIELD OF THE INVENTION

This invention relates generally to absorption cooling units which use lithium bromide as a solution, and more specifically to an on line system for removing unwanted copper from the lithium bromide solution.

BACKGROUND OF THE INVENTION

In absorption cooling units the system uses water as a refrigerant and lithium bromide which has a high infinity for water as an absorbent. To operate efficiently, it is important that the lithium bromide solution does not become contaminated with unwanted contaminants which would aversely effect the efficiency of the system. One common problem associated with absorption systems of this type is that air tends to leak into the vacuum of the system and combines with copper components within the system such as tubing to form copper oxides. This results in the formation of ionic copper being placed into the lithium bromide solution and plating out onto metal components of the system which adversely detracts from the efficiency of the system. Copper plating and buildup is commonly found on external pumps, bearings, plugging filters, and under certain high temperature operating conditions results in the solution chemistry of the lithium bromide solution being adversely affected. This can lead a system shutdown resulting in lost time of operation, the replacement of lithium bromide solution, and in some cases replacing components parts which have been plated. Copper contents greater than about 50 parts per million are considered a problem, and in situations of this type, concentrations of copper in the range of 200 to 1000 parts per million are not uncommon.

The problem of unwanted copper being present the lithium bromide solution has been a long standing problem in the field and to date has not been solved in any satisfactory matter.

It is therefore an object of the present invention to provide an efficient copper removal system for absorption cooling units.

It is the further object of the present invention to provide an efficient on line copper removal system for absorption units.

It is yet another object of the present invention to provide an on line copper removal system for absorption units which use lithium bromide as a solution, and which allows the system to effectively operate while the copper is being removed.

It is yet a further object of the present invention to provide an efficient on line copper removal system for units using lithium bromide as a solution which can be installed simply by retrofitting an existing absorption system while it is still running.

SUMMARY OF THE INVENTION

The present invention relates to an on line copper removal system for an absorption cooling unit which operates while the unit is in operation. Specifically, the invention relates to passing a selected amount of the lithium bromide solution in the system from a flow line through a bypass which contains an electroplating unit or cell which effectively plates out the copper inside the cell. Through this system the unwanted copper which is contained in the lithium bromide solution is selectively plated out by the electroplating cell and does not deposit on the internal metal surfaces of the absorption cooling unit components as commonly occurs in conventional absorption cooling units of the prior art. The electroplating unit is typically on line outside of the internal chiller device as will be described in greater detail hereinafter. The solution is passed through a bypass flow into the copper removal cell which contains a metal anode and the copper is plated on the inside metal surfaces of the cell which acts as a cathode. The cell is powered by a low voltage DC power source. The system of the present invention can effectively reduce the copper concentration in lithium bromide solutions to below the 50 parts per million threshold which is an unacceptable level for the efficient operation of a lithium bromide solution in an absorption cooling unit.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
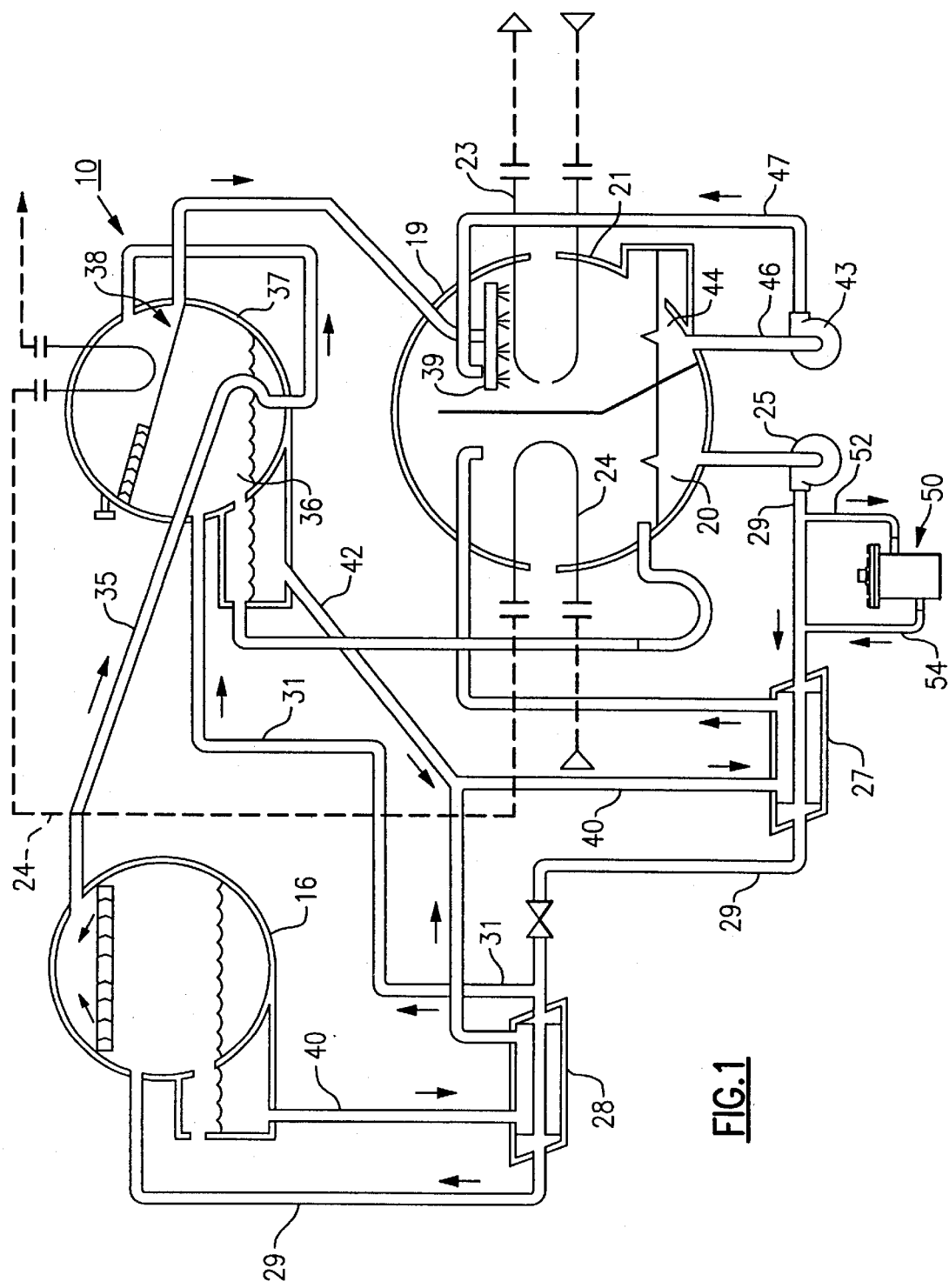
FIG. 1 is a schematic diagram of a multiple-state absorption heating and cooling machine embodying the teachings of the present invention.

Referring initially to FIG. 1, there is illustrated in schematic form the component parts of a typical absorption system 10 to which the present invention is applicable. The operation of the cycle will be described in regard to the machine running in a cooling mode, however, it should be evident to one skilled in the art that the cycle can be adjusted so that the machine can also operate in a heating mode. The present system employs water as a refrigerant and lithium bromide, which has a high affinity for water, as an absorbent.

The machine includes an evaporator 19 and an absorber 20 mounted in a side-by-side relationship within a common shell 21. Liquid refrigerant used in the process is vaporized in the evaporator where it absorbs heat from a substance that is being chilled. The substance being chilled is brought through the evaporator by a chilled water line 23. Vaporized refrigerant developed in the evaporator is passed to the absorber where it is combined with an absorbent to create a solution suitable for use in the process. Heat developed in the absorption process is taken out of the absorber by means of a water line 24.

Weak solution which is rich in refrigerant is drawn from the absorber by means of a solution pump 25. The weak solution is passed in series through a first low temperature solution heat exchanger 27 and a second high temperature solution heat exchanger 28 by means of delivery line 29. As will be explained in greater detail below, the weak solution is brought into heat transfer relationship with strong solution being returned to the absorber from the two generators employed in the system thereby raising the temperature of the weak solution as it moves into the generators.

Upon leaving the low temperature solution heat exchanger, a portion of the weak solution is sent to the low temperature generator 37 via low temperature solution line 31. The remaining weak solution is sent through the high temperature solution heat exchanger 28 on to the high temperature generator 16 via solution line 29. Although not shown in FIG. 1, the weak solution in the high temperature generator is heated by the burner to vaporize the refrigerant and thus, remove it from the solution. The water vapor that is boiled away is passed by means of vapor line 35 into the low temperature generator 36 which is housed in shell 37 along with the system condenser 38. Here, the remainder of the weak solution is heated and refrigerant contained therein is vaporized by the high temperature refrigerant and delivered, along with the high temperature generator vapor condensate, into the system condenser. In the condenser, the refrigerant vapors are placed in heat transfer relationship with the cooling water passing through line 24 to place refrigerant in a subcooled liquid state.

The condensed liquid refrigerant from the condenser is gravity fed to a spray header 39 located in the top part of the evaporator and sprayed over the chilled water tubes to produce cooling. Strong absorbent solution flows from the two generators back to the absorber to be reused in the absorption cycle. On its return, the strong solution from the high temperature generator is passed through the high temperature solution heat exchanger 28 and then through the second low temperature solution heat exchanger 27 via solution return line 40. Strong solution leaving the low temperature generator is connected into the solution return line by means of a feeder line 42 which enters the return line at the entrance of the second solution heat exchanger.

A refrigerant pump 43 is connected to the sump 44 of the system evaporator by a suction line 46 and is arranged to return liquid refrigerant collected in the sump back to the spray header 39 via supply line 47.

Figure 2:
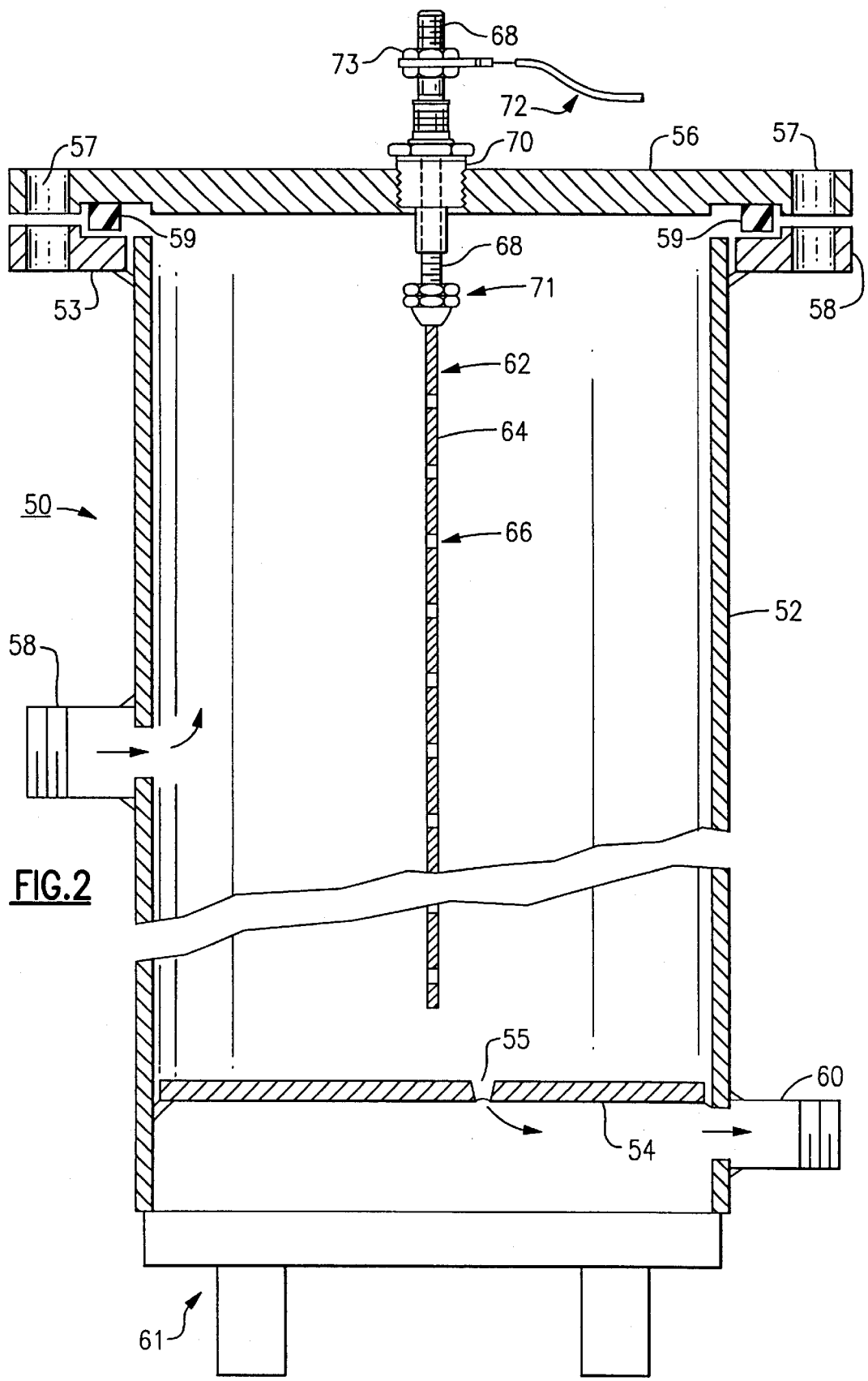
FIG. 2 is an enlarged side sectional view illustrating the on line copper removal cell of the present invention.
Figure 3:
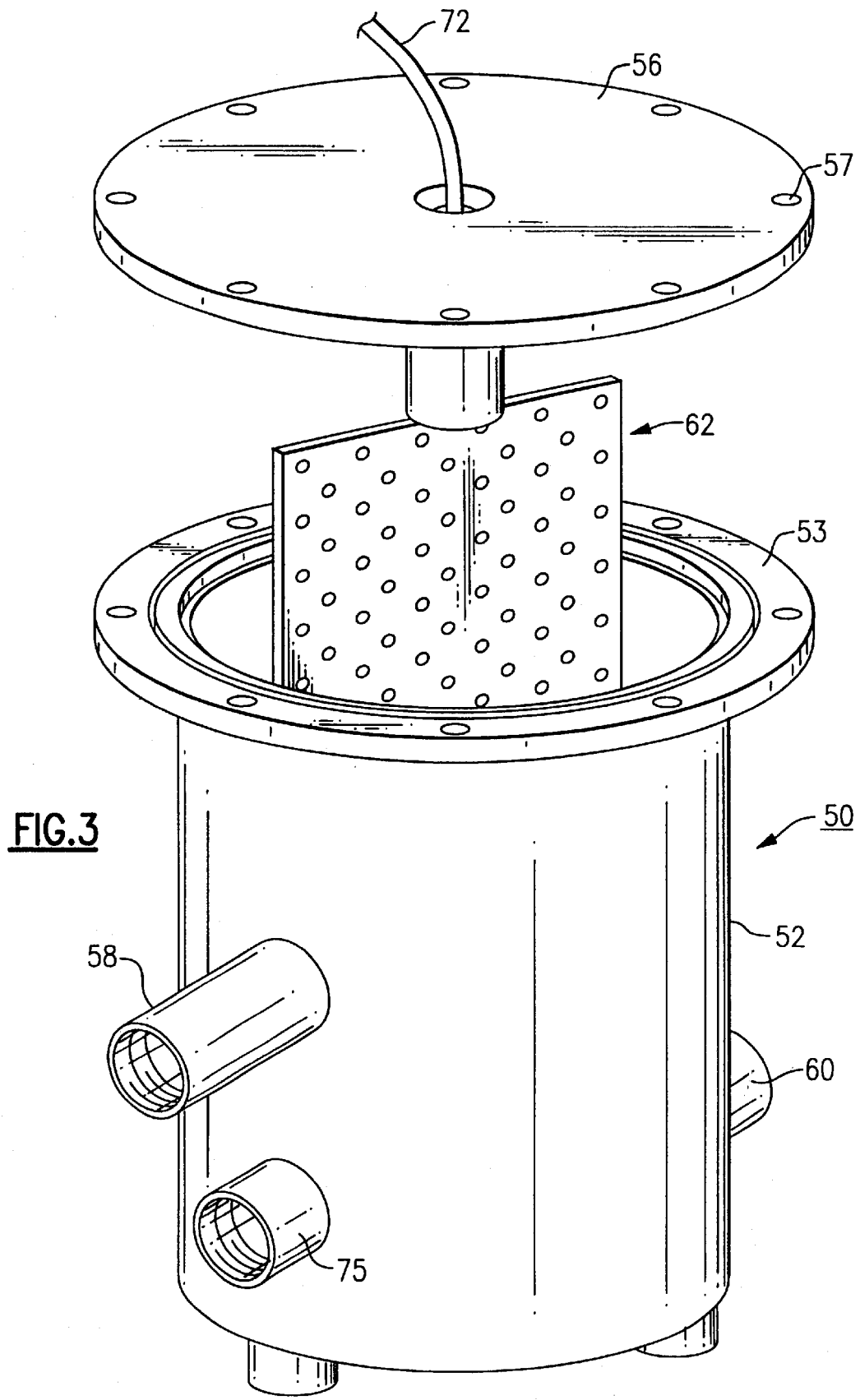
FIG. 3 is a perspective view of the cell of FIG. 2.

According to the present invention the electroplating cell 50 of the present invention is positioned on delivery line 29 to receive and treat a selected amount of solution from pump 25 through a bypass flow inlet pipe 52 and outlet pipe 54. This system allows for the selected flow of lithium bromide solution which contains the unwanted cooper to flow through electroplating cell 50, usually at a flow rate which is significantly lower than the primary flow solution through delivery line 29. Flow through the electroplating cell should be at least about 2 to 3 gpm. FIG. 2 is an enlarged side sectional view illustrating the on line copper removal cell 50 of the present invention, and FIG. 3 is a perspective view of the device illustrated in FIG. 2. The cell 50 is typically made of a metal such as steel and comprises a cylindrical side wall 52, a bottom plate 54 having an orifice 55, a top cover 56, inlet 58 and outlet 60. Item 75 is a fitting to attach a drain, and is used when servicing the cell. The top cover is secured with bolts (not shown) to the top of the side walls through a flange member 53 through a plurality of aligned holes 57 and gasket 59. The cell is supported on base member 61. An electrode 62 which functions as an anode is disposed in the cell and contains a plurality of holes or perforations 66. Typically the electrode is made of a metal or alloy 64 such as stainless steel. A threaded metal shaft 68 which is partially encased in an outer ceramic sleeve 69 is held in threaded engagement through metal nut 70 in a threaded hole in the center of cover 56. A metal connector 71 connects electrode 62 to shaft 68. An electrical wire 72 is attached to metal nut 71 and connected to a suitable power source such as a battery which can be activated by any suitable switch. The circuit schematic for this system is illustrated in FIG. 4.

Figure 4:
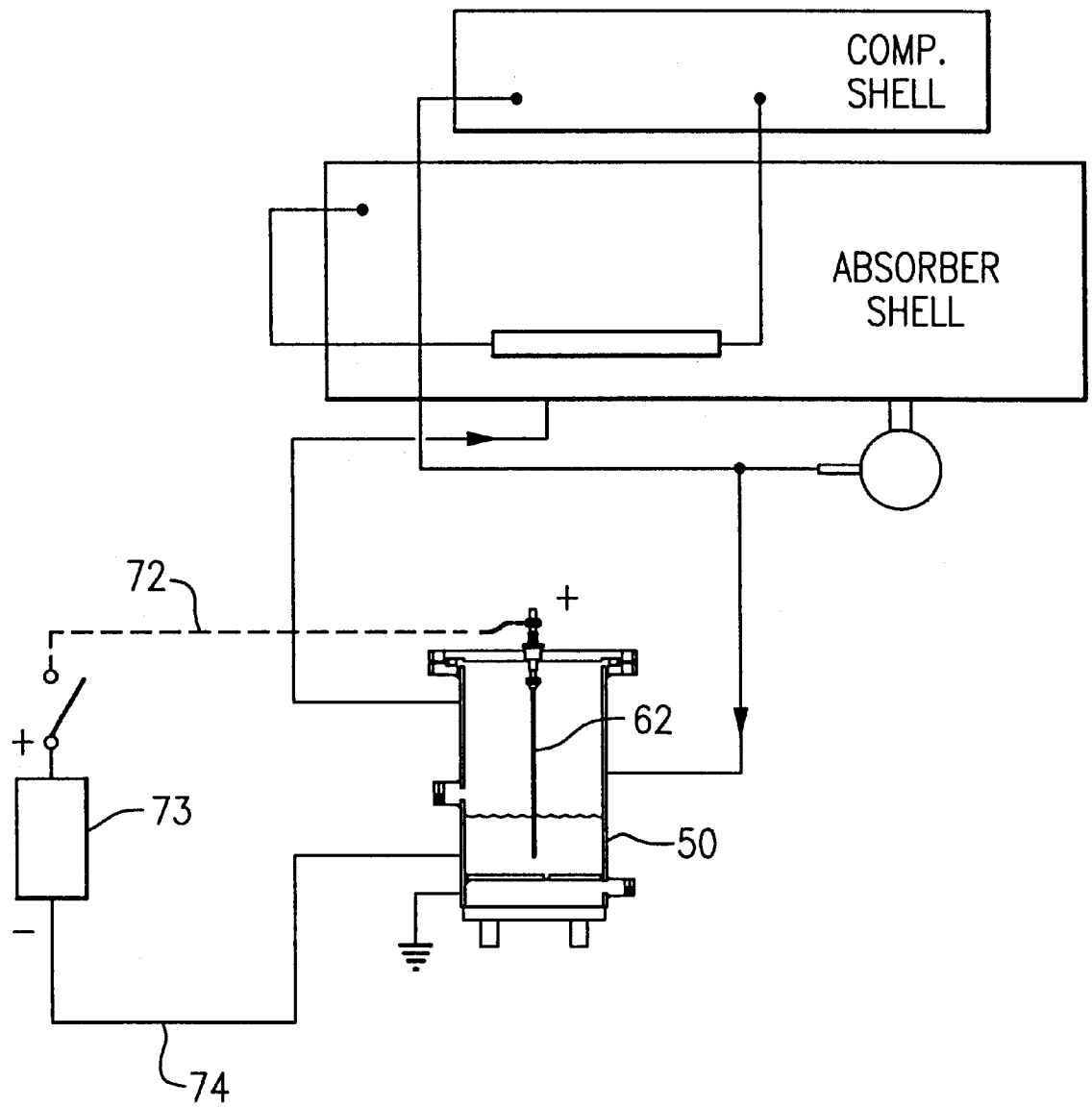
FIG. 4 is a schematic drawing of the electroplating cell circuit.

In FIG. 4, a DC electric current is generated from a power source such as a 1.5–3 volt battery or other DC power source 73, and passes through connecting wire 72 to shaft 68 through metal nut 71 to electrode 62. This wire has a positive polarity. A second wire 74, which has a negative polarity, connects the power source to the side wall of cell 50 to complete the electrical circuit. The cell is also grounded. Electrode 62, which functions as an anode, passes an electric current through the aqueous lithium bromide (salt) solution (not shown) in the cell which contains copper ions which are plated out on the inside walls of the cell which functions as a cathode. Typically after a week or more of operation, the cell is taken off line, the deposited copper cleaned off the side walls and the cell placed back on line. Optionally, the used cell may be replaced with an unused one if cleaning becomes too time consuming.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. An on line copper removal system for use in an absorption cooling unit which includes an evaporator means, an absorber means, a generator means and a condenser means which are interconnected to provide an absorption cycle in which a lithium bromide solution which contains a deleterious amount of copper is circulated through said unit through a series of interconnected flow lines and pumps, the improvement comprising an electroplating cell connected in a bypass mode to one of said flow lines to selectively plate copper out of said lithium bromide solution by flowing said lithium bromide through said cell at a controlled flow rate while said unit is in operation.

2. The system of claim 1 in which the plating cell utilizes a replaceable metal electrode (anode) to plate out said copper on the inside walls of the cell.

3. The system of claim 2 in which the lithium bromide flow rate through the plating cell is significantly lower than the primary solution flow.

4. An on line copper removal system for use in an absorption cooling unit which includes an evaporator means, an absorber means, a generator means and a condenser means which are interconnected to provide an absorption cycle in which a lithium bromide solution which contains a deleterious amount of copper is circulated through said unit through a series of interconnected flow lines and pumps, said system further including an electroplating cell connected to one of said flow lines to selectively plate copper out of said lithium bromide solution while said unit is in operation.

* * * * *